US012074897B1

United States Patent
Sánchez

(10) Patent No.: US 12,074,897 B1
(45) Date of Patent: Aug. 27, 2024

(54) MACHINE LEARNED ALERT TRIAGE CLASSIFICATION SYSTEM

(71) Applicant: Rapid7, Inc., Boston, MA (US)

(72) Inventor: Carlos Manuel Pastor Sánchez, Belfast (GB)

(73) Assignee: Rapid7, Inc., Boston, MA (US)

(*) Notice: Subject to any disclaimer, the term of this patent is extended or adjusted under 35 U.S.C. 154(b) by 241 days.

(21) Appl. No.: 17/088,644

(22) Filed: Nov. 4, 2020

(51) Int. Cl.
*H04L 9/40* (2022.01)
*G06F 18/214* (2023.01)
*G06N 20/00* (2019.01)

(52) U.S. Cl.
CPC ........ *H04L 63/1433* (2013.01); *G06F 18/214* (2023.01); *G06N 20/00* (2019.01); *H04L 63/0236* (2013.01); *H04L 63/1416* (2013.01)

(58) Field of Classification Search
CPC ............ H04L 63/1433; H04L 63/1416; G06K 9/6256; G06N 20/00
See application file for complete search history.

(56) References Cited

U.S. PATENT DOCUMENTS

| | | | | |
|---|---|---|---|---|
| 9,992,211 B1* | 6/2018 | Viljoen | ................. | G06F 21/577 |
| 2016/0359891 A1* | 12/2016 | Pang | ..................... | G06F 21/566 |
| 2018/0124098 A1* | 5/2018 | Carver | ................... | G06N 20/00 |
| 2019/0260804 A1* | 8/2019 | Beck | ....................... | G06F 40/40 |
| 2020/0162496 A1* | 5/2020 | Medalion | ............ | H04L 63/1416 |
| 2020/0280530 A1* | 9/2020 | Kessler | ................... | H04L 47/50 |
| 2020/0380386 A1* | 12/2020 | Dinh | ....................... | G06N 20/00 |
| 2021/0110266 A1* | 4/2021 | Wang | ..................... | G06N 3/045 |
| 2021/0126938 A1* | 4/2021 | Trost | ..................... | G06F 21/552 |
| 2021/0295583 A1* | 9/2021 | Vaidyanathan | ....... | G06T 15/005 |
| 2021/0326744 A1* | 10/2021 | Israel | ....................... | G06N 5/02 |

* cited by examiner

*Primary Examiner* — Shin-Hon (Eric) Chen
*Assistant Examiner* — Thomas A Carnes
(74) *Attorney, Agent, or Firm* — Ashwin Anand

(57) ABSTRACT

Disclosed herein are systems, methods, and processes for a machine learned alert triaging classification (ATC) system that uses machine learning techniques to generate an alert triage classification model that can be trained and deployed in modern security operation centers to optimize alert triaging and cyber threat classification. A training dataset of classified records is obtained. Each classified record in the training dataset includes detection characteristics data of a set of machines and threat classification results produced by performing alert triage classification of detection messages associated with the set of machines. An ATC model is trained using the training dataset according to a machine learning technique. The training tunes the ATC model to classify, based on at least the detection characteristics data, a new detection message associated with a machine from the set of machines as a threat or as not a threat.

17 Claims, 9 Drawing Sheets

400B

*Alert 405(2)*

| id | org_id | alert_time | alert_type | severity | source_system | current_status | owner |
|---|---|---|---|---|---|---|---|
| alert1 | myOrgId | 11:20 | incorrectlogin | 2 | VM | open | unasg |

*Detection Message 220(new2) + Existing Detection Messages*

| id | alert_id | org_id | detection_type | source_system | merging_keys |
|---|---|---|---|---|---|
| detection1 | alert1 | myOrgId | incorrectlogin | VM | {user, hostName, ipAddress} |
| detection2 | alert1 | myOrgId | incorrectlogin | VM | {user, hostName, ipAddress} |
| ⋮ | ⋮ | ⋮ | ⋮ | ⋮ | ⋮ |
| detection(n) | alert1 | myOrgId | incorrectlogin | VM | {user, hostName, ipAddress} |

*Observable 410(2) + Existing Observeables*

| id | alert_id | detection_id | data |
|---|---|---|---|
| observable1 | alert1 | detection1 | { ... "user": "cpastor01", ... "hostName": "MDBCH2301", ... "ipAddress": "185.3.1.23" } |
| ⋮ | ⋮ | ⋮ | ⋮ |
| observable(n) | alert1 | detection(n) | { ... "user": "cpastor01", ... "hostName": "MDBCH2301", ... "ipAddress": "185.3.1.23" } |

*FIG. 4B*

MACHINE LEARNED ALERT TRIAGE CLASSIFICATION SYSTEM

BACKGROUND

Field of the Disclosure

This disclosure is related is to managed detection and response (MDR) computing environments. In particular, this disclosure is related to a machine learned alert triage classification system for MDR-enabled security operation centers (SOCs).

Description of the Related Art

Managed detection and response (MDR) services and solutions involve security analysts in a security operation center (SOC) actively administering and managing a given customer's cybersecurity program and services. Security analysts, who are trained cybersecurity professionals, typically spend an inordinate amount of time just investigating problems, issues, vulnerabilities, and incidents for a company. Threat investigation (e.g., threat hunting, and the like) is extremely time consuming and unduly expensive.

Modern cybersecurity solutions typically generate millions of messages whose corresponding alerts have to be investigated, sometimes individually or in batches, by security analysts. In certain scenarios, a significant portion of such alerts can include previously-encountered issues (e.g., by other security analysts) or even false positives. Therefore, merely determining whether a message is an actual threat or whether the message can be confidently discarded is a laborious process for modern information technology (IT) departments.

Unfortunately, in several existing MDR implementations, such triaging (e.g., determining whether an alert is suspicious or can be safely ignored and/or discarded) is often times performed manually by security analysts. Manual alert triaging is not only time consuming and resource prohibitive, but can also pose security risks (e.g., because of overwhelmed security analysts not being able to react to a real threat in a timely fashion). Therefore, it would be beneficial for security analysts in modern SOCs to focus on actual investigation (and response) rather than manually triaging an unreasonable amount of alerts.

SUMMARY OF THE DISCLOSURE

Disclosed herein are methods, systems, and processes that implement a machine learned alert triage classification system. One such method involves obtaining a training dataset of a plurality of classified records, where each classified record in the training dataset includes detection characteristics data of a set of machines and threat classification results produced by performing an alert triage classification of the detection messages associated with the set of machines. The method further involves training an alert triage classification model using the training dataset and according to a machine learning technique. The training tunes the alert triage classification model to classify, based on the detection characteristics data, a new detection message associated with a machine of the set of machines as a threat or as not a threat.

In one embodiment, the method involves monitoring a detection message queue associated with detection source systems that protect the set of machines and retrieving the detection messages from the detection message queue. The detection messages are received from the detection source systems operating on each of the set of machines and each detection message includes detection data associated with a machine protected by a detection source system and detection metadata associated with the detection source system.

In another embodiment, the method involves accessing a merging key that is part of a detection message, and based on the merging key, appending the detection message to an existing alert or generating a new alert for the detection message.

In some embodiments, the method involves monitoring the detection message queue, collecting the detection characteristics data for the training dataset from the detection source systems, performing alert triage classification on each detection message in the detection message queue to generate the threat classification results for the training dataset, and subsequent to the training, using the alert triage classification model to classify the new detection message as the threat or as not the threat.

In other embodiments, the detection source systems include an agent, a scan engine, a vulnerability management (VM) system, a security information and event management (SIEM) system, a penetration testing system, an application security testing system, and/or a cloud security posture management (CSPM) system.

In certain embodiments, the alert triage classification is performed based on whether detection data and/or detection metadata in the detection message indicates that a corresponding machine is subject to or will be subject to one or more types of malicious attacks.

In some embodiments, the detection message includes a list of key-value pairs (KVPs). In other embodiments, the detection data includes a process name, Secure Shell (SSH) information, a hostname, a geo-location, an internet protocol (IP) address, and/or PowerShell information associated with the machine. In certain embodiments, the detection metadata includes an organization identifier and a version identifier associated with a detection source system.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

The present disclosure may be better understood, and its numerous objects, features and advantages made apparent by referencing the accompanying drawings and/or figures.

FIG. 4B is a block diagram 400B illustrating another example of processing a detection message using an alert triage classification model, according to certain embodiments.

Figure 1:
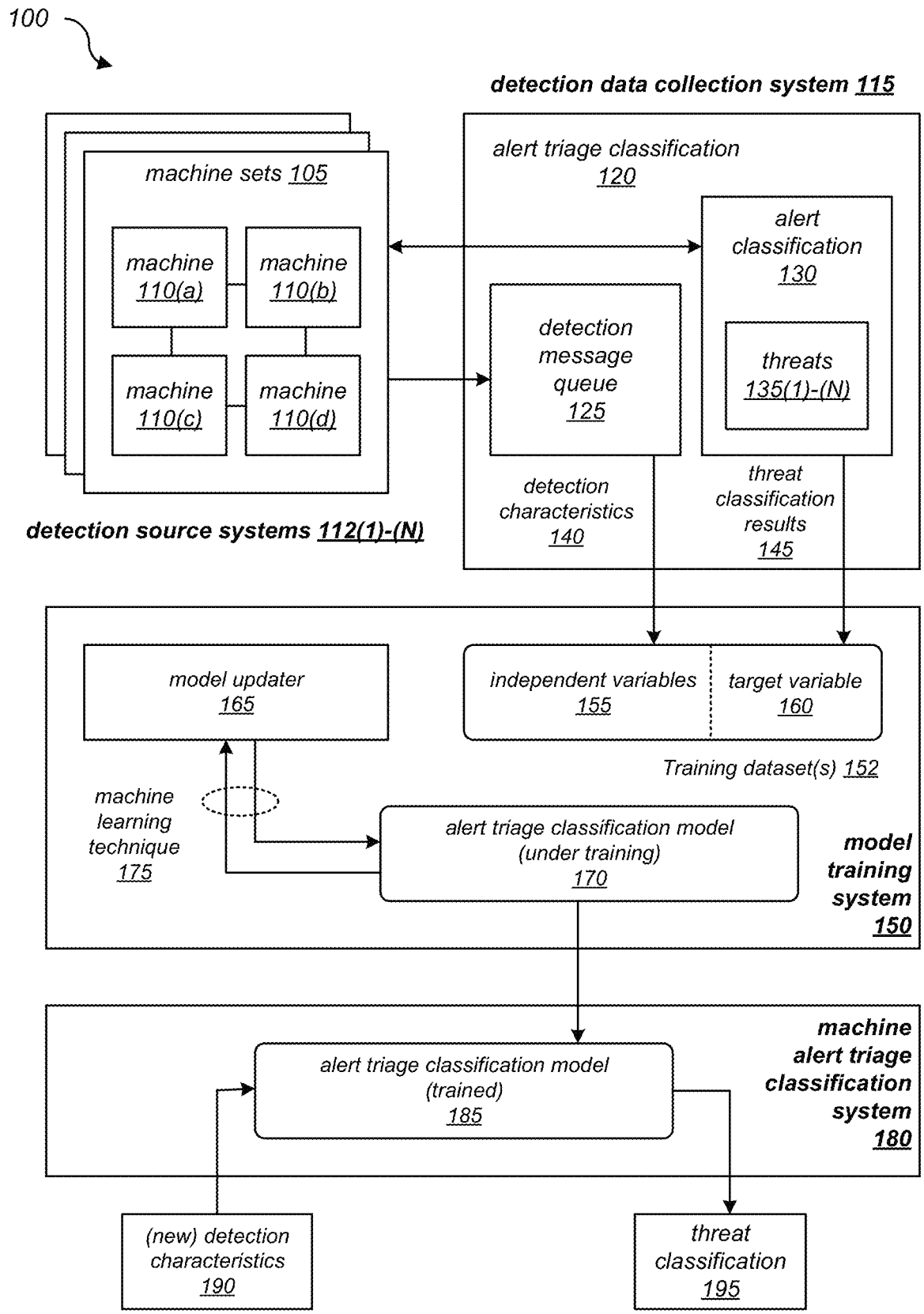
FIG. 1 is a block diagram 100 illustrating a model training system that can be used to train an alert triage classification model to identify cyber threats, according to certain embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the words "may" or "can" are used in a permissive sense (i.e., meaning having the potential to), rather than the mandatory sense (i.e., meaning must). Similarly, the words "include," "including," and "includes" mean including, but not limited to.

DETAILED DESCRIPTION

Introduction

In modern cybersecurity computing environments, customers typically deploy one or more cybersecurity solutions that perform various targeted operations aimed at keeping the customer's network and networked devices safe from potentially crippling cyber threats posed by malicious actors. Examples of such targeted operations and/or cybersecurity solutions include, but are not limited to: vulnerability risk management (VRM), incident detection and response (IDR), security information and event management (SIEM), dynamic application security testing (DAST), penetration testing, cloud security posture management (CSPM), and the like.

The foregoing operations and/or solutions can utilize agents and scan engines, primarily for data collection and analysis (DCA). An agent is lightweight software that is installed on a customer's computing assets (e.g., in the cloud or on premises), to centralize and monitor data. Therefore, the agent provides endpoint visibility and detection by collecting live system information (e.g., basic asset identification information, running processes, logs, and the like), and sends this information for analysis (e.g., to a detection agent for vulnerability assessment, incident detection, and the like). A scan engine actively scans a customer's network to discover computing assets for vulnerability assessment, policy compliance, and the like. In this manner, both agents and scan engines operate as data collectors.

As noted, agents are installed on customer computing assets to send data back to a centralized location for threat analysis. In a managed detection and response (MDR) scenario, this centralized location includes a cybersecurity platform (e.g., the Insight Platform provided by Rapid7®, Inc., of Boston, MA) in security operations center (SOC) that consumes detection messages (e.g., via a detection agent). The SOC also includes security analysts who investigate cyber threats in the customer's environment based on these detection messages. For example, an agent on a customer computing asset sends data to detection agents. In this example, the detection agent generates a detection message if the detection agent discovers, for instance, an unusual login or an unexpected process (among others). In existing implementations, this detection message is then consumed and investigated by a security analyst in the SOC to determine if the detection message is an actual cyber threat or can be confidently discarded.

Unfortunately, given the complexity and scale of modern customer computing environments, millions of these detection messages are generated and therefore, the investigation (also referred to herein as triage) involved is laborious, time-consuming, and resource-intensive. In certain scenarios, an investigation by a security analyst can take days or even weeks to complete as the security analyst has to manually sift through detection messages and determine if the detection message warrants being classified as a cyber threat.

In existing MDR implementations, triaging is done manually by human actors (e.g., security analysts). To wit, security analysts currently have to spend an inordinate amount of time examining huge volumes of alerts and disparate uncorroborated detection messages (even if two or more detection messages are the same or similar to each other) to determine whether a given detection message looks suspicious. Needless to say, existing triaging and investigative processes and methodologies are inefficient, laborious, time-consuming, and prohibitively expensive (e.g., from both a human and computing resource standpoint). These shortcomings can also pose a security risk in terms of occupying a security analyst's attention on mundane low-level tasks and not on responding to threats in a timely manner. Security analysts must be freed from redundant alert triaging tasks so that they can better focus on responding to actual threats.

Disclosed herein are systems, methods, and processes for a machine learned alert triaging classification system that uses one or more machine learning techniques to generate an alert triage classification model that can be trained and deployed in modern SOCs to optimize alert triaging and cyber threat classification and identification.

Example Alert Triage Model Training System

FIG. 1 is a block diagram 100 illustrating a model training system that can be used to train an alert triage classification model to identify cyber threats (hereinafter simply "threats"), according to certain embodiments. The model training system of FIG. 1 employs a data-driven approach, using a machine learned alert triage classification (ATC) model. In some embodiments, the ATC model may accept as input a set of detection characteristics about computing assets (e.g., login information, running processes, software and/or hardware configurations and settings, installed software, account information, device usage, and the like), and produce as output a binary threat classification indicating whether a detection message is a threat or not a threat.

In certain embodiments, the ATC model may be a logistic regression model that is trained to return a threat classification result indicating whether one or more detection messages are to be designated as threats (or vice-versa). For example, the ATC model can be trained using a machine learning technique (e.g., via a form of supervised training), where the ATC model is trained using a set of training data labeled with truth labels (e.g., whether pre-existing detection messages are threats or not threats based on certain detection characteristics and other user-configurable detection parameters). Each observation record in the training dataset can include a set of independent variables representing the ATC model's inputs and a set of target variables (e.g., the truth labels) representing the ATC model's desired output(s). The ATC model is then trained to accurately predict the truth label values based on the input features of the observation records.

Traditionally, truth data for threat modeling is maintained in a confidential manner (e.g., given sensitive customer information, asset information, and the like). For example, the target variable of an alert triage model may include a binary indicator that indicates whether a detection message is a threat or not a threat. However, such data is unique to each SOC and customer and cannot be treated in a formulaic manner. To obtain truth data for the ATC model, embodiments of the alert triage model training system disclosed herein obtain data related to how security analysts have treated previous detection messages and alerts in MDR environments with distinctive customer asset (e.g., a machine) and security solution combination (examples of which are noted above). This distinctive "machine—security solution" combination is referred to herein as a detection source system. The results of how security analysts have triaged existing detection messages and alerts from detection source systems (e.g., in the past) are used to populate the target variable. This target variable is then used to label training data records that include the relevant input features of the machines (e.g., detection characteristics). In some embodiments, the detection characteristics data and alert triaging results may be gathered in automated processes, for example, by a machine monitoring service.

Advantageously, by automating the alert triaging process, the disclosed approach minimizes security analyst error in formula-based or manual threat assessment techniques. Moreover, the disclosed ATC model outputs threat assessment as a binary value, which is intuitive and confidence-inducing to security analysts. The ATC model can also be updated using additional training enabling flexibility to adapt to changes in the cybersecurity landscape.

In some embodiments, the alert triage model training system may be accessible by individual security analysts to create custom ATC models. Different security analysts may have different opinions or first-hand experiences and knowledge about relevant input variables, useful target variables, and/or model detection parameters. The alert triage model training system may provide a configuration interface to permit these security analysts to configure the detection parameters of the ATC model to create custom ATC models to suit their specific preferences.

As will be appreciated by those skilled in the art, the disclosed methods, systems, processes to build and use the ATC model provide numerous technical improvements to enhance the functioning of existing cyber threat assessment systems in the state of the art. These and other features and benefits of such methods, systems, and processes are described in further detail below, in connection with the figures.

As previously noted, FIG. 1 illustrates an alert triage model training system, according to certain embodiments. As shown, FIG. 1 depicts a model training system 150 that is used to train an alert triage classification (ATC) model 170, using one or more training datasets 152. In this example, the training datasets 152 are build using a detection data collection system 115. Depending on the embodiment, detection data collection system 115 may be implemented as part of model training system 150, or as part of a separate computing system. For example, portions of detection data collection system 115 may be implemented by a separate machine monitoring service that is configured to periodically collect data from the private networks of a large number of clients at disparate geographic locations.

Detection data collection system 115 is configured to collect detection data and detection metadata (e.g., in the form of detection messages) from different machine sets 105. Each machine set 105 may include one or more machines 110(a)-(d) or computing assets, which may be connected in a network. As previously noted, machines 110(a)-(d) each can be protected by one or more cybersecurity solutions (e.g., VRM, IDR, SIEM, CSPM, and the like—implemented in the cloud (e.g., as part of a centralized cybersecurity platform like Insight Platform) or on premises (e.g., on the machines themselves, for instance, like an agent or on-premise versions of the foregoing solutions). Therefore, in some embodiments, machines 110(a)-(d) are referred to as "protected machines."

Also as previously noted, a distinctive "machine—security solution" combination is called a detection source system. Therefore, because machines 110(a)-(d) are protected machines, machines 110(a)-(d) and the on-premise or cloud-based counterpart cybersecurity solutions that are involved in protecting machines 110(a)-(d) (e.g., VRM, IDR, SIEM, agent, CSPM, ODIN (which is a vulnerability and exploit database provided by Rapid7®, Inc., of Boston, MA), and similar cybersecurity solutions) and generate detection messages (e.g., a detection agent implemented by the Insight Platform to receive data from agents) are called detection source systems 112(1)-(N). In some embodiments, machine sets 105 may be entire networks or a machine set 105 may include only one computing asset (e.g., a single server).

Detection data collection system 115 may implement a detection message queue 125 component and an alert classification 130 component. In some embodiments, these two components may be implemented as two separate systems. Detection message queue 125 receives detection messages from detection source systems 112(1)-(N) and is tasked with collecting detection characteristics 140 from different machine sets 105. Detection characteristics 140 can include detection data that is relevant to cyber threat assessments such as login information, running processes, event logs, configuration settings, and other information. Detection characteristics 140 can also include detection metadata associated with various detection source systems such as organization identifiers, version identifiers, and other information. Therefore, detection characteristics 140 can include detection data associated with machine sets 105 and detection metadata associated with detection source systems 112(1)-(N). As may be appreciated by those skilled in the art, the collected data may include a wide variety of detection characteristics 140 of both machines 110(a)-(d) (e.g., in the form of detection data) and detection source systems 112(1)-(N) (e.g., in the form on detection metadata).

In some embodiments, detection data collection system 115 may periodically collect such detection characteristics 140 based on a schedule or change events, and maintain a virtual representation of machines 110(a)-(d) or machine sets 105 separately from the machine sets themselves. These virtual representations may be used by a variety of machine assessment or reporting processes, in addition to the process of creating training datasets 152 for model training system 150. As shown in FIG. 1, alert triage classification 120 component also includes alert classification 130 component with threats 135(1)-(N).

In addition to detection characteristics 140 derived from detection message queue 125, alert triage classification 120 of detection data collection system 115 also uses alert classification 130 to classify pre-existing detection messages and/or alerts (e.g., that are part of an alert database) as one or more of threats 135(1)-(N). For example, this process produces threat classification results 145 (e.g., example manually derived triage results or pre-existing triage results) and, as noted, can be performed manually by a security analyst to assist with model training. Therefore, detection data collection system 115 not only provides detection characteristics 140 for ATC model training but also provides actual (and dependable) security analyst triage results in the form of threat classification results 145 for model training.

Model training system 150 constructs a training dataset 152 from detection characteristics 140 and threat classification results 145. Training dataset 152 includes a number of observation records constituting "observations" about machine sets 105. Each observation record may include a set of independent variables 155, which includes detection characteristics 140, and one or more target variables 160, which indicates threat classification results 145. In some embodiments, threat classification results 145 may be used as the truth label for each observation record to be used to train ATC model 170. In other embodiments, target variable 160 may be a binary value indicating whether a given detection message (e.g., whether recently consumed "live" for on-the-fly classification by a security analyst or previously consumed and classified by the security analyst) is a threat or not a threat. Model training system 150 may provide a configuration or feature engineering interface to allow users to specify what types of detection characteristics, detection parameters, or threat classification input(s) to use to train ATC model 170.

Model training system 150 may implement a model updater 165, which may be configured to train ATC model 170 using one or more machine learning techniques 175. Depending on the embodiment, ATC model 170 may be implemented using a variety of different types of machine learning models, including decision tree models, neural networks, linear or logistic regression models, support vector machines, and the like. In some embodiments, ATC model 170 may include an ensemble of multiple machine learning models, possibly of different model types. ATC model 170 may be trained using a supervised training process. During this type of process, the observation records in training dataset 152 are labeled with known output (e.g., threat classification results 145).

Next, the training data is fed into ATC model 170 to generate determinations of target variable 160 (e.g., a binary 'threat or not a threat' result). ATC model 170's determinations as to threat assessment can be compared against the truth labels of the training records, and ATC model 170's detection/decision parameters can be adjusted based on the accuracy of its threat assessment determination. Over many iterations of the training process, the detection parameters of ATC model 170 can be tuned to produce threat assessment results with a high degree of accuracy. In one implementation, model training system 150 employs the SCIKIT-LEARN library for machine learning and code written in the R language to build training datasets 152 and train ATC model 170. Depending on the embodiment, other types of machine learning tools and platforms such as TENSOR-FLOW, AMAZON SAGEMAKER, AZURE ML STUDIO, or JUPYTER NOTEBOOK may also be used.

As shown in FIG. 1, once ATC model 170 is sufficiently trained (e.g., when ATC model 170 satisfies a model evaluation criterion based on an evaluated dataset), ATC model 170 is deployed to a machine alert triage classification system 180. Machine alert triage classification system 180 may be used to make threat assessment decisions for detection characteristics 150 collected from real-world machines (e.g., in the form of new detection messages). Using trained ATC model 170, machine alert triage classification system 180 generates a threat classification 195 to identify whether a given detection message is a threat or not a threat. Advantageously, machine alert triage classification system 180 is able to use trained ATC model 185 to generate threat classification 195 based on (new) detection characteristics 190 alone, without having to actually perform threat classification on machine sets 105, which can be unduly burdensome.

In some embodiments, machine alert triage classification system 180 may be configured to continuously monitor threat classification(s) 195 of a set of machines indicated by detection messages from corresponding detection source systems. If threat classification(s) 195 exceeds a certain number of alerts for the given set of detection messages, an alert or notification may be generated to a security analyst. If threat classification(s) 195 abruptly change for a given machine, automated actions can be triggered by machine alert triage classification system 180 (e.g., sandboxing or quarantining the machines, and the like). In some embodiments, machine alert triage classification system 180 may employ a cloud-based hosting and management service such as GOOGLE CLOUD ML ENGINE or AMAZON SAGE-MAKER.

Example Alert Triage Classification (ATC) Server

Figure 2:
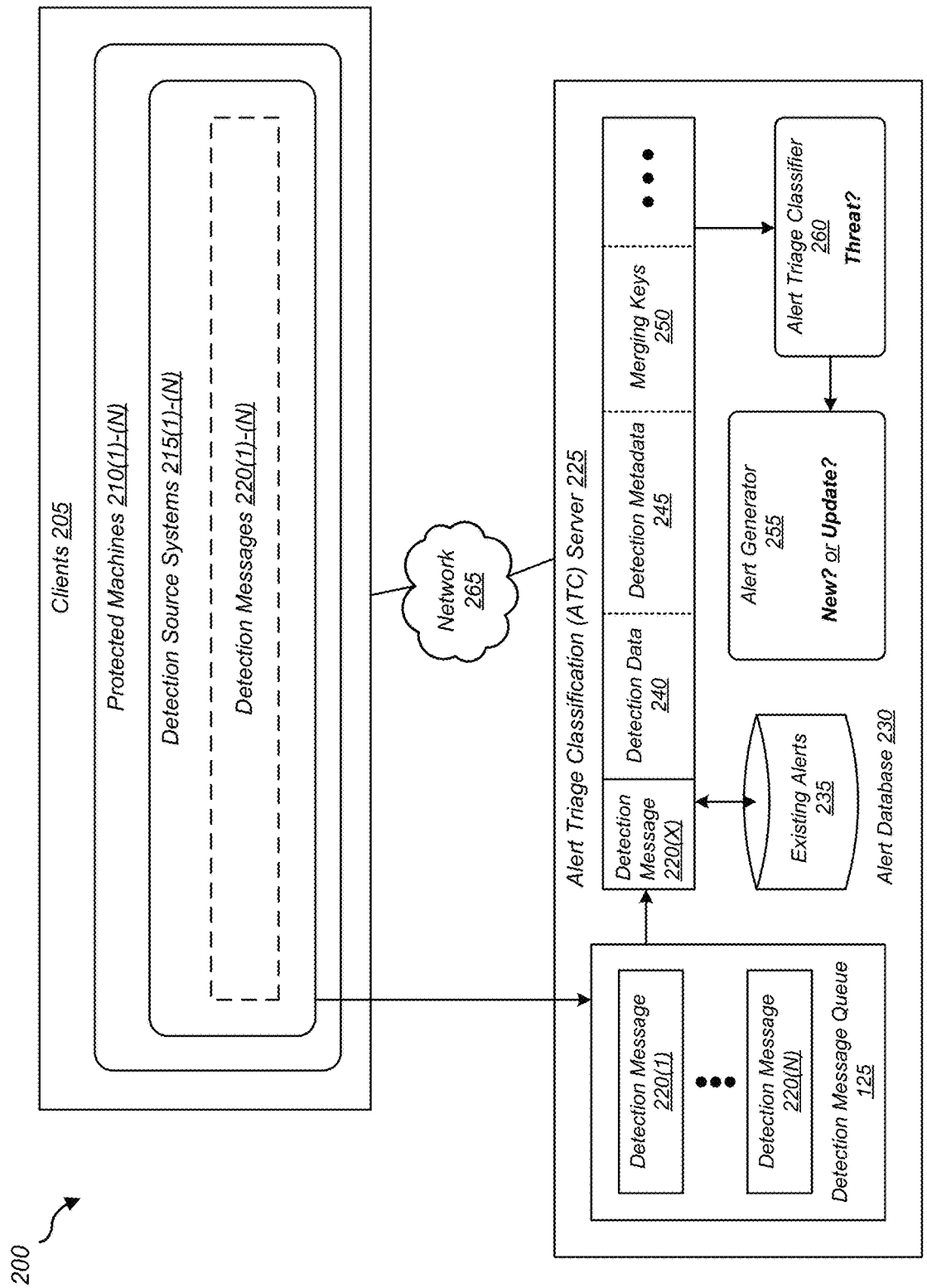
FIG. 2 is a block diagram 200 illustrating an alert triage classification server that processes detection messages using an alert triage classifier to determine whether a detection message is indicative of a cyber threat, according to some embodiments.

FIG. 2 is a block diagram 200 illustrating an alert triage classification (ATC) server 225 that processes detection messages using an alert triage classifier 260 (e.g., ATC model 185 as shown in FIG. 1) to determine whether a detection message is indicative of a cyber threat, according to some embodiments. As shown in FIG. 2, clients 205 include protected machines 210(1)-(N) with detection source systems 215(1)-(N) that generate detection messages 220(1)-(N). Protected machines 210(1)-(N) can include any type of physical or virtual computing devices implemented on-premises or based in the Cloud. Clients 205, which can include one or more customers' networked environments are communicatively coupled to ATC server 225 via network 265, which be any type of network or interconnection.

ATC server 225 includes detection message queue 125 to process and manage detection messages 220(1)-(N). For example, a detection message 220(X), which is representative of each of detection messages 220(1)-(N), includes at least detection data 240, detection metadata 245, and merging keys 250. Detection message 220(X) is processed by alert triage classifier 260, which is trained ATC model 185. Alert triage classifier 260 determines whether detection message 220(X) is a threat or not a threat, based at least in part, on detection data 240 and detection metadata 245 (without the need for prior threat classification results). In certain embodiments, alert triage classifier 265 then instructs an alert generator 255 to generate a new alert for detection message 220(X) or update an existing alert for detection message 220(X).

As previously noted, security analysts currently have to spend an inordinate amount of time examining huge volumes of alerts and disparate uncorroborated detection messages (even if two or more detection messages are the same or similar to each other) to determine whether a given detection message looks suspicious. Unfortunately, existing implementations do not corroborate same or similar detection messages to a single alert, resulting in a voluminous number of alerts that can quickly become unmanageable for a security analyst. Therefore, in some embodiments, ATC server 225 uses merging keys 250 in each detection message to group detection messages associated with the same or similar process, action, operation, or cause indicated by a detection source system (that gave rise to the detection message) into a single group or single alert—thus, significantly optimizing alert management and resource utilization.

Each detection message includes one or more merging keys 250. Merging keys 250 include information that correlates detection data 240 from protected machines and detection metadata 245 from detection source systems such that detection messages that are potentially indicative of the same threat (e.g., the same login into a protected machine performed 100 times and flagged by an IDR detection source system) can be grouped together and assigned a single alert, instead of multiple redundant alerts. In this manner, ATC server 225 can use merging keys 225 in detection messages to update or fine tune trained ATC model 185 by permitting threat classification to be performed on multiple detection messages at the same time.

As shown in FIG. 2, ATC server 225 also includes an alert database 230 with existing alerts 235. Prior to generating a new alert using alert generator 255, ATC server 225 determines whether an existing alert 235 exists in alert database 230 for detection message 220(X) based on merging keys 250. If merging keys 250 indicates that an alert already exists, alert generator 255 appends detection message 220(X) to an existing alert. However, if an alert does not exist in alert database 230, alert generator 255 generates a new alert for detection message 220(X) (or a single alert for a group of related detection messages if merging keys 250 indicates that they emanate from the same source and/or have the same cause).

Example Workflow of Alert Triage Classification (ATC) System

Figure 3:
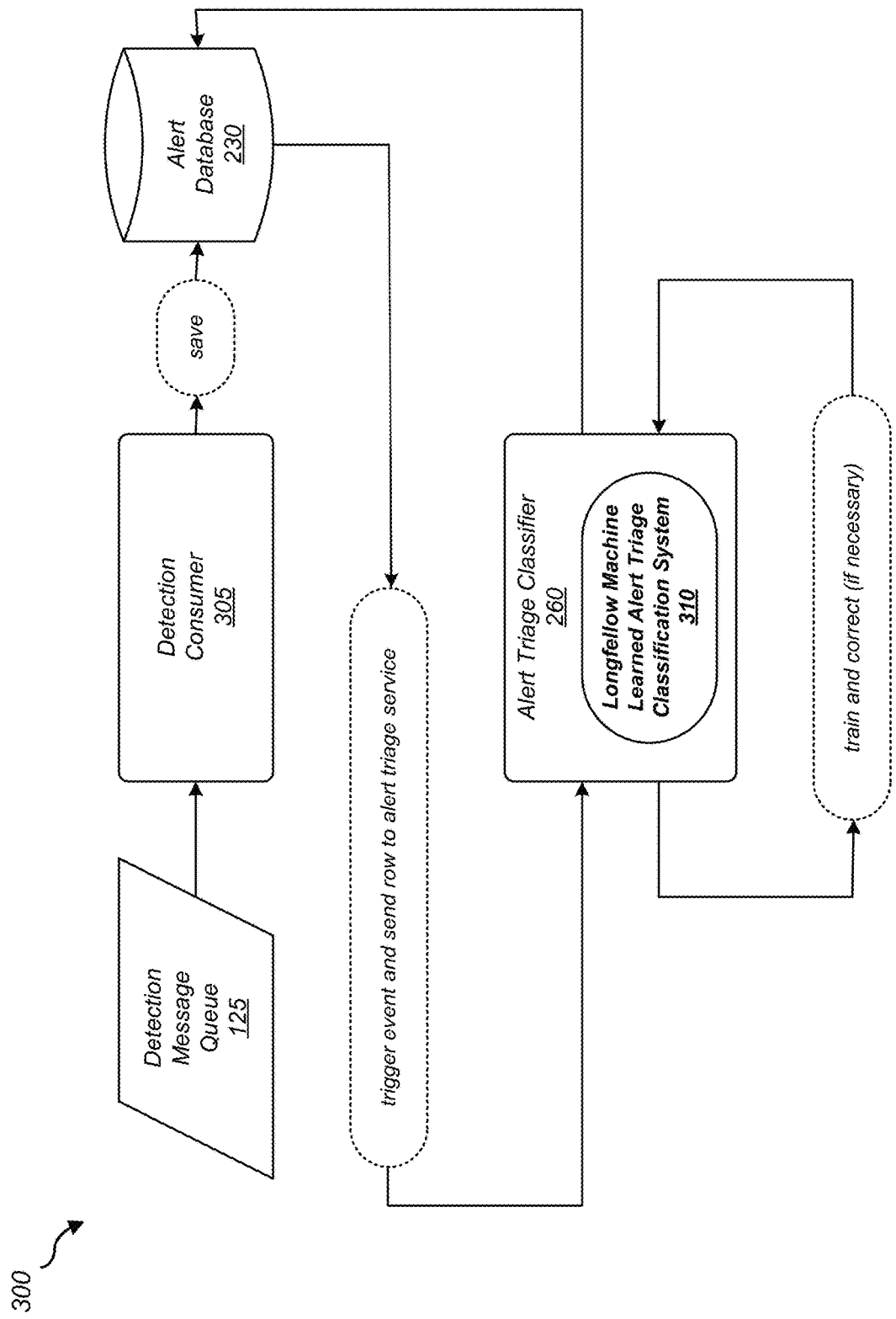
FIG. 3 is a block diagram 300 illustrating a computational workflow of an alert triage classification system, according to certain embodiments.

FIG. 3 is a block diagram 300 illustrating a computational workflow of an alert triage classification system, according to certain embodiments. A Longfellow machine learned alert triage classification (ATC) system 310 is implemented by alert triage classifier 260. This system includes at least detection message queue 125, a detection consumer 305 (e.g., to consume and process incoming detection messages from one or more detection source systems such as IDR, ODIN, and the like), and alert database 230 (e.g., to maintain existing alerts 235). Longfellow machine learned ATC system 310 includes trained ATC model 185. As previously noted, ATC model 170 is first trained and configured for cyber threat assessment before being deployed to Longfellow machine learned ATC system 310 as ATC model 185 (e.g., alert triage classifier 260). In certain embodiments, ATC model 185 can be implemented by ATC server 225 (e.g., shown as alert triage classifier 260 in FIG. 2). The results of triaging performed by ATC model 185 can be displayed in a console frontend to enable security analysts to prioritize valuable alerts.

In one embodiment, training dataset 152 of classified records is obtained. Each classified record in training dataset 152 includes at least (1) detection characteristics data of a set of machines (e.g., detection characteristics 140 as shown in FIG. 1) and (2) threat classification results 145 produced by performing alert triage classification 120 of one or more of detection messages 220(1)-(N) associated with machine sets 105 (and generated by one or more of detection source systems 112(1)-(N)). Next, ATC model 170 is trained using training dataset 152 and according to machine learning technique 175. The training tunes ATC model 185 to classify, based on detection characteristics 140, a new detection message associated with machine 110(a) of machine sets 105 as a threat or as not a threat.

In certain embodiments, detection message queue 125 associated with detection source systems 215(1)-(N) (shown as detection source systems 112(1)-(N) in FIG. 1) that protect protected machines 210(1)-(N) is monitored. One or more detection messages 220(1)-(N) are retrieved from detection message queue 125, where the retrieved detection messages are received from one or more detection source systems 110(1)-(N) operating on protected machines 210 (1)-(N) (e.g., on-premises, or via a cloud-based platform). In this example, and as shown in FIG. 2, each detection message (e.g., detection message 220(X)) includes detection data 240 associated with at least one of protected machines 210(1)-(N) and detection metadata 245 associated with at least one of detection source systems 215(1)-(N).

In some embodiments, detection data 240 includes at least a process name, Secure Shell (SSH) information, a hostname, a geo-location, an internet protocol (IP) address, and/or PowerShell information associated with one or more machines (among other machine-related data and information). In other embodiments, detection metadata 245 includes at least an organization identifier and a version identifier associated with one or more detection source systems (among other detection source system-related data and information).

In one embodiment, for each detection message, a merging key that is part of the detection message is accessed (e.g., merging keys 250 as shown in FIG. 2). Based on the merging key(s), the detection message is appended to an existing alert, or a new alert is generated for the detection message (e.g., by alert generator 255 as shown in FIG. 2). In this example, the detection message(s) include a list of key-value pairs (KVPs).

In another embodiment, a network-accessible device like the system shown in FIG. 3 is used to monitor detection message queue 125, collect detection characteristics 140 for training dataset 152 from one or more detection source systems 112(1)-(N), and perform alert triage classification 120 on each detection message in detection message queue 125 to generate threat classification results 145 for training dataset 152. Subsequent to training and deploying ATC model 170 (e.g., as ATC model 185/alert triage classifier 260), a new detection message can be automatically classified as a threat or as not a threat (e.g., by Longfellow machine learned ATC system 310 as shown in FIG. 3). In this example, alert triage classification (e.g., by trained ATC model 185) is performed based on whether detection data 240 and/or detection metadata 245 indicates that a corresponding (protected) machine is subject to or will be subject to one or more types of malicious attacks (e.g., a brute force login attempt).

In certain embodiments, detection consumer 305 consumes detection messages 220(1)-(N) from detection message queue 125. Detection consumer 305 looks at merging keys 250 and if there is a match between the received merging keys 250 and existing merging keys (e.g., maintained in alert database 230 or by ATC server 225). If newly received merging keys match existing merging keys of one or more associated detection messages, detection consumer 305 appends a detection (e.g., a detection message) to an existing alert. If there are no matches, a new alert is generated. The alert is then saved to alert database 230, as shown in FIG. 3. Saving an alert in alert database 230 broadcasts an event that can be listened to (e.g., the whole row is sent to the new service—an alert triage classifier application).

In one embodiment, Longfellow machine learned ATC system 310 (e.g., the new service), listens to such events from alert database 230 and starts a threat classification process to classify the alert. In some embodiments, if the alert is an existing alert, alert triage classifier 260 determines if the alert's classification needs to be changed. For example, an alert that was not considered a threat may have to be changed to a threat because of a recent change. For instance, let's assume that Longfellow machine learned ATC system 310 knows that an alert of type incorrectLogin is typically considered a threat once there are at least 100 detections in the alert in the same day. If detection consumer 305 receives a detection message that is the $100^{th}$ detection for this alert, alert classifier 260 automatically marks the alert as a threat, before a security analyst has to undertake the same task.

In other embodiments, if the alert is a new alert, Longfellow machine learned ATC system 310 will check if the alert needs to be considered a threat as soon as it becomes an alert. For example, if Longfellow machine learned ATC system 310 knows that security analysts consider as a threat any alert of type processOnAsset, where the process name SSH and the new alert that was generated match, alert classifier 260 marks this alert as a threat. Advantageously, Longfellow machine learned ATC system 310 does not only classify alerts based on prior knowledge, but also constantly learns and updates itself based on decisions that may later be corrected by a security analyst.

Examples of Processing a New Detection Message Using an ATC Model

Figure 4A:
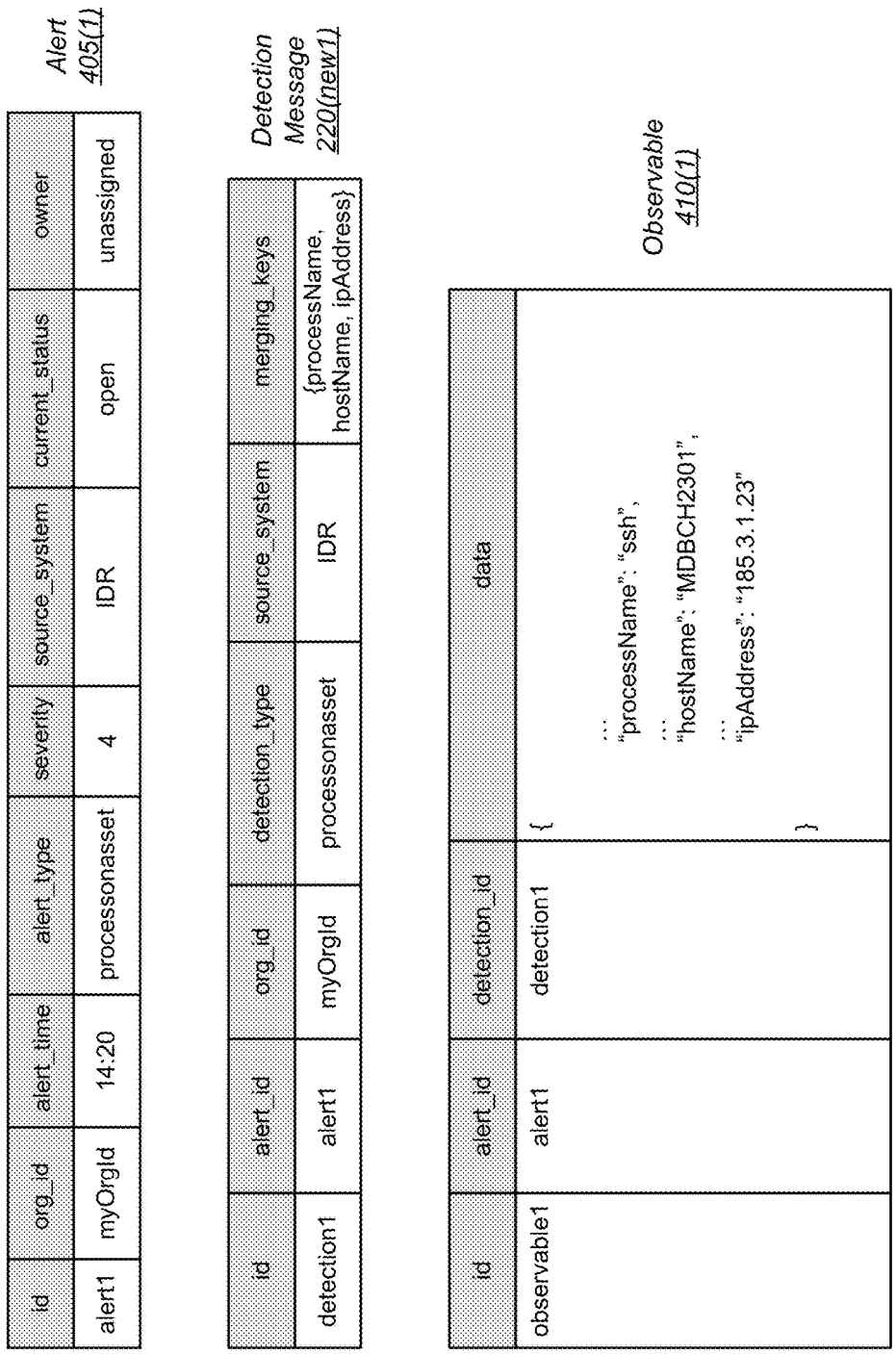
FIG. 4A is a block diagram 400A illustrating an example of processing a detection message using an alert triage classification model, according to some embodiments.

FIG. 4A is a block diagram 400A illustrating an example of processing a detection message using an alert triage classification model, according to some embodiments. FIG. 4A shows an alert 405(1) that includes at least an alert identifier, an organization identifier, an alert time, an alert type, a severity, a (detection) source system, a current status, and an owner. A detection message that generated alert 405(1) and is saved in alert database 230 is shown as detection message 220(new1) and includes at least a detection identifier, the alert identifier, the organization identifier, a detection type, the (detection) source system, and merging keys. The observable data (e.g., also referred to herein as observation records) that created detection message 220 (new1) in the given detection source system is also saved in alert database 230 and includes at least an observable identifier, the alert identifier, the detection identifier, and detection data (e.g., shown as observable 410(1) in FIG. 4A).

Once the foregoing (e.g., alert 405(1), detection message 220(new1) and observable 410(1)) is saved (e.g., to alert database 230 as shown in FIG. 3 or to any other data storing mechanism that can store alerts), an event is triggered from alert database 230 and is received by Longfellow machine learned ATC system 310 that will then determine that alert 405(1) is of type processonasset, and its corresponding observable (e.g., observable 410(1)) has a key processName with the value ssh. Because Longfellow machine learned ATC system 310 is trained (e.g., as trained ATC model 185 as shown in FIG. 1) to identify and indicate as a threat any alert that is of type processonasset and has a processName with the value ssh, alert 405(1) is designated as a threat by Longfellow machine learned ATC system 310.

FIG. 4B is a block diagram 400B illustrating another example of processing a detection message using an alert triage classification model, according to certain embodiments. This example illustrates a scenario where there is an existing alert and new detections are received to be appended to the existing alert. The alert is shown as alert 405(2) in FIG. 4B. The detection table includes all the detections (e.g., detections 1-$n$) that belong to alert 405(2), including the new detection (shown as detection 405(new2) in FIG. 4B). The observable data that created the detection (s) in the detection source system is also saved (e.g., in alert database 230). As each detection has at least one observable attached to it, in this example one can assume that the number of detections and observables are the same.

Once the new detection and observable (e.g., detection message 220(new2) and observable 410(2)) have been saved (e.g., into alert database 230), an event of an updated alert is triggered. Longfellow machine learned ATC system 310 receives the foregoing event and checks the type of the event. Because the alert is of type incorrectLogin, Longfellow machine learned ATC system 310 then determines the number of detections related to the alert, and when Longfellow machine learned ATC system 310 determines that there are, for example, 100 or more detections (e.g., where detection (n) shown in FIG. 4B is detection (100 or greater)), Longfellow machine learned ATC system 310 marks the alert (e.g., alert 405(2)) as a threat.

Advantageously, the threat classification and alert triage decision(s) made by Longfellow machine learned ATC system 310 can always be corrected by a security analyst who can review the alert and further decide whether the threat determination should be maintained or discarded. If the decision of Longfellow machine learned ATC system 310 is corrected, new detection parameters can be fed into Longfellow machine learned ATC system 310 that will enable Longfellow machine learned ATC system 310 to become better at triaging future alerts.

Example of Training and Deploying Custom ATC Models

Figure 5:
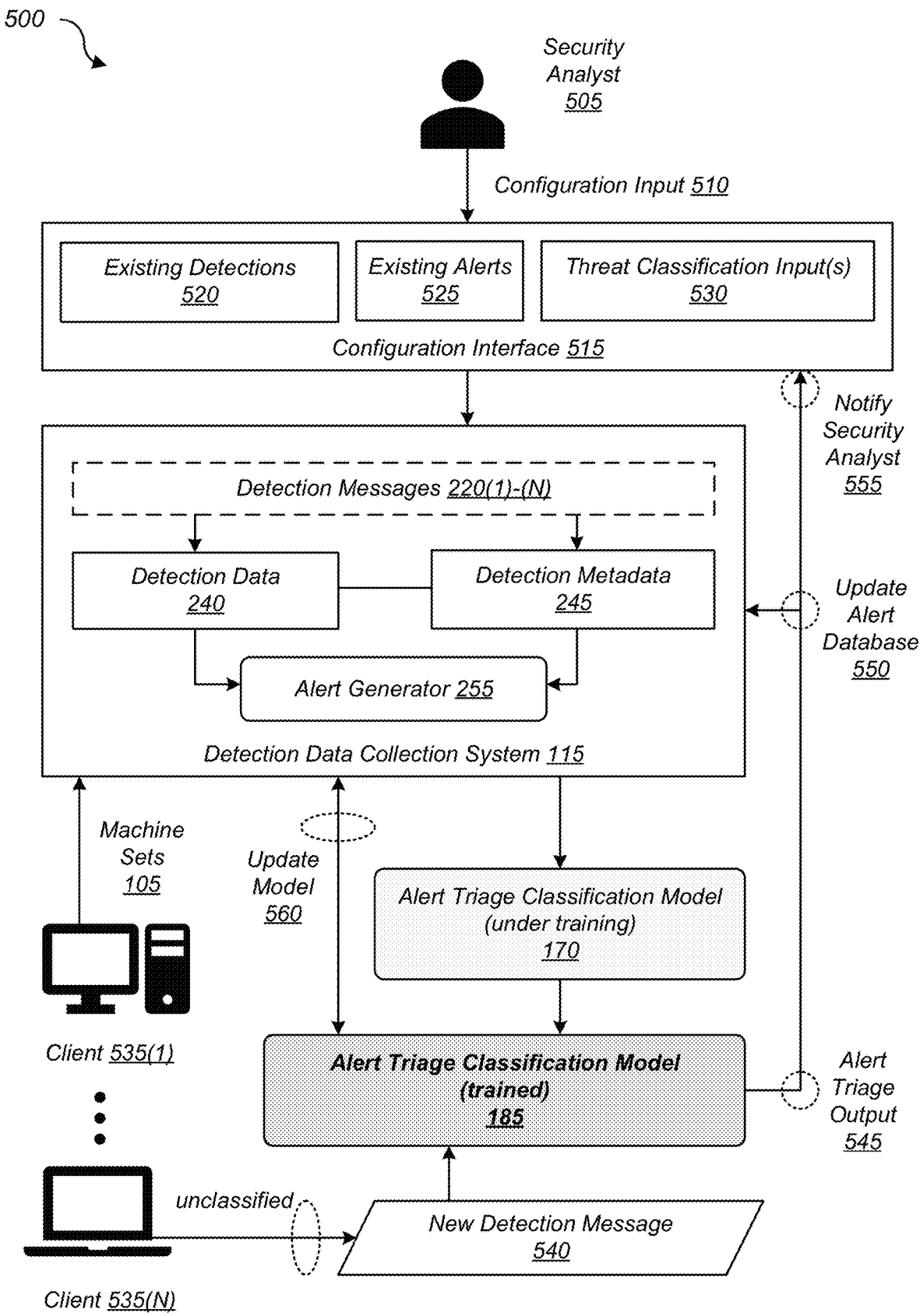
FIG. 5 is a block diagram 500 illustrating the training and deployment of an alert triage classification model, according to some embodiments.

FIG. 5 is a block diagram 500 illustrating the training and deployment of an alert triage classification model (e.g., for a specific client), according to some embodiments. Security analyst 505 working on behalf of a particular client (e.g., client 535(1)) can configure (e.g., configuration input 510) various existing detections, alerts, and threat classifications via configuration interface 515 for a trained ATC model 185 that is specific to that client.

In some embodiments, the client may be a client of a monitoring service (e.g., a machine monitoring service). As shown, client 535(1) (e.g., a part of clients 205 as shown in FIG. 2), operates a computing environment that includes machine sets 105 of client machines. Security analyst 505 may configure various existing detections, alerts, and threat classifications of the custom ATC model (e.g., ATC model 185), including existing detections 520 and existing alerts 525 (e.g., from other security analysts or other sources such as a vulnerability database), and threat classification input(s)

530 (e.g., previously classified alerts). For example, security analyst 505 may select a particular set of detection parameters that is specific to client 535(1). The configured existing detections 520 may control the behavior of detection data collection system 115 and existing alerts 525 and threat classification input(s) 530 may control the behavior of alert triage classification 120. In some embodiments, security analyst 505 may also select custom output variables to be generated by ATC model 185 (e.g., specific threat classifications). Configuration input 510 may indicate whether threat classifications are to be generated for groups of machines or individual machines, or whether corresponding detection source systems that generate specific detection messages should be treated differently.

As shown in FIG. 5, alert triage output 545 can be used to update alert database 550 and notify security analyst 555. If a new detection message 540 is received from client 535(N) and is determined to be unclassified, ATC model 185 can be used to process the new detection. The new detection can then used to update model 560 (e.g., by contributing new detection data and detection metadata to detection data collection system 115).

In some embodiments, custom ATC models may be developed for not just particular clients, but particular types of machines, detection source systems, malicious attacks, suspicious operations, or environmental factors. For example, a custom ATC model may be created for LINUX machines that are used as web servers and are protected by an IDR detection source system. As another example, a custom ATC model may be created for IDR detection source systems or VRM detection source systems. Custom ATC models can also be created for specific combinations of machines and detection source systems (e.g., mobile phones issued to employees that are protected by a CSPM detection source system). All such ATC models may be maintained and managed by a model execution system (e.g., machine alert triage classification system 180 of FIG. 1) and may be updated with new training data over time.

Example of Generating an ATC Model Output

Figure 6:
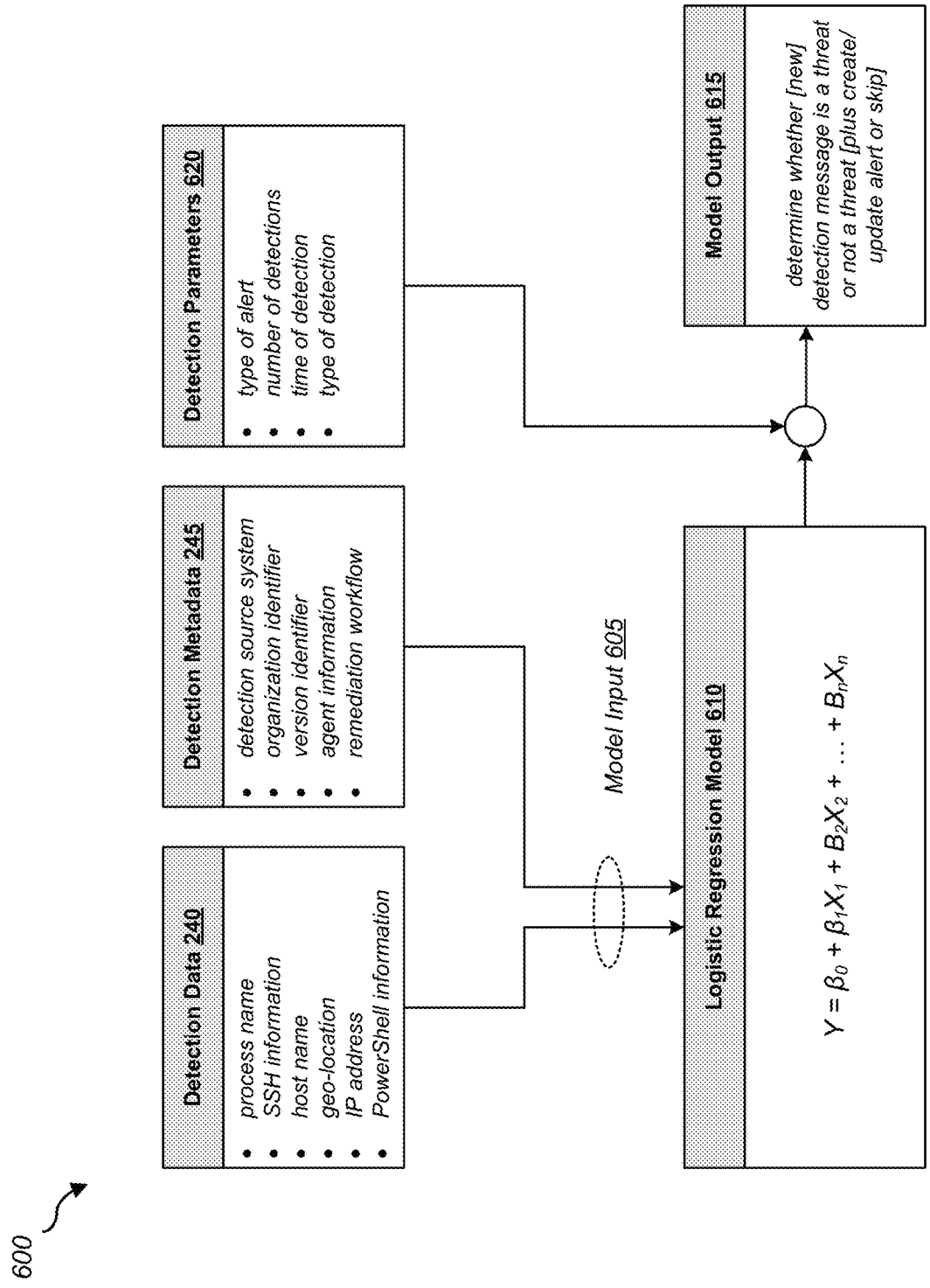
FIG. 6 is a block diagram 600 of using a logistic regression model to process model inputs and generate a model output, according to certain embodiments.

FIG. 6 is a block diagram 600 of using a logistic regression model to process model inputs and generate a model output 615, according to certain embodiments. In addition to detection data 240 and detection metadata 245 that become part of the disclosed machine learning process, another type of configuration that can be made through configuration interface 515 is detection parameters 620. In some embodiments, such parameters can be adjusted outside of the machine learning process. For example, detection parameters may dictate how many different instances of decision trees are to be used in a random forest model, how many layers will be used by a neural network, any regularization parameters to be used during training, particular interpretive thresholds used to translate the model's output into classified results, and the like. In other embodiments, configuration interface 515 may also permit security analyst 505 to specify the scope of data collection (e.g., whether certain machines in machine set 105 are to be included, how often to collect training data, how to filter or sample the training data, and the like).

As shown in FIG. 6, detection parameters 620 are used outside the machine learning process and can include a type of alert, the number of detections, and the time of detections. First, with respect to the type of alerts, certain types of alerts may be considered threats right away, where as other types of alerts may depend on other parameters. For instance in one embodiment, an alert type processOnAsset can be considered a threat if the processName is immediately ssh regardless of the number of detections. Second, with respect to the number of detections, the number of detections that belong to a single alert can be indicative of a possible threat. For example, in another embodiment, an alert type of incorrectLogin can be considered a threat if the number of detections on the alert is 100 or over and not a threat if the number of detections is under 100. Third, with respect to the time when a detection was created by a detection source system, an alert with multiple detections within a range of time (e.g., 10 minutes, 1 hour, 1 day, and the like), can be considered threats. For example, in one embodiment, an alert of type processOnAsset can be considered a threat if processName msword.exe and the number of detections is over 50 within the past hour. Advantageously, information and configuration input(s) related to the foregoing detection parameters 620 (e.g., type of alert, number of detections, time of detection, type of detection, and the like), can be taken into consideration by the ATC models—in addition to detection data 240 and detection metadata 245.

The logistic regression model 610 shown in FIG. 6 may be an embodiment of ATC model 170 or ATC model 185 of FIG. 1. However, in other embodiments, other types of machine learning models such as decision tree models, neural networks, support vector machines, and the like, are also contemplated. Logistic regression model 610 provides for a binomial where a target variable can have 2 possible status values: threat or not a threat. ATC model 185 also provides for high precision/low recall because it reduces the number of false positives (false negatives are not of particular concern as it is better to be safe than sorry in a cyber threat scenario).

FIG. 6 also illustrates various examples of detection data 240 and detection metadata 245 that can be used as model input 605. Examples of detection data 240 include, but are not limited to, process name, SSH information, host name, geo-location, IP address, and/or PowerShell information. Examples of detection metadata 245 include, but are not limited to, detection source system identifier, organization identifier, version identifier, agent information, and/or remediation workflow. As will be appreciated by those skilled in the art, the types of input data shown here are merely examples. A variety of other types of data may be used as input to the ATC model(s) to perform threat classification and alert triaging, without departing from the spirit of the inventions disclosed herein.

Example Process for Training and Deploying an ATC Model

Figure 7:
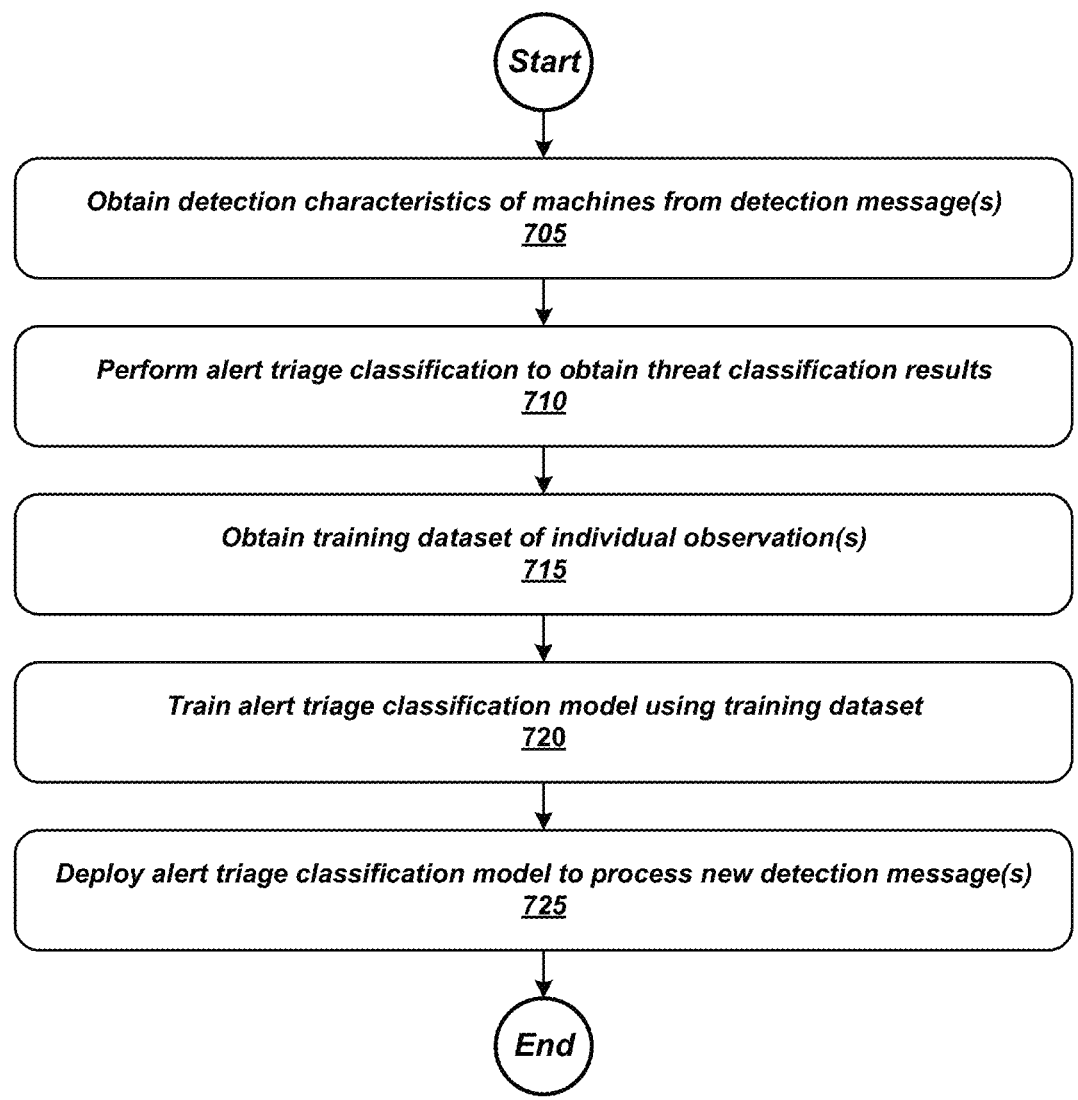
FIG. 7 is a flowchart 700 illustrating a process for training and deploying a machine learned alert triage classification model to identify cyber threats based on detection messages, according to some embodiments.

FIG. 7 is a flowchart 700 illustrating a process for training and deploying a machine learned alert triage classification model to identify cyber threats based on detection messages, according to some embodiments. The process begins at 705 by obtaining detection characteristics of machines from detection messages. For example, detection characteristics 140, which include detection data 240 and detection metadata 245, are obtained via detection message queue 125 from various detection messages generated by detection source systems 112(1)-(N). At 710, the process performs alert triage classification to obtain threat classification results. For example, detection data collection system 115 performs alert classification 130 on threats 135(1)-(N) (e.g., threats 135 (1)-(N) refer to existing or available alerts related to potential threats—not the actual threats themselves) to generate threat classification results 145. This process of processing detections and performing initial alert triaging (e.g., based on configurable inputs by security analyst 505 as shown in FIG. 5) is called alert triage classification 120.

At 715, the process obtains a training dataset of individual observations. For example, model training system 150 that trains ATC model 170 obtains training dataset 152 from detection data collection system 115. This training dataset 152 includes individual observations such as observations 410(1) and 410(2) as shown in FIGS. 4A and 4B, respectively. At 720, the process trains an alert triage classification model using the training dataset. For example, as shown in FIGS. 1, 5, and 6, ATC model 170 is trained based on model inputs 605 that include at least detection data 240 and detection metadata 245 (e.g., using logistic regression model 610, among other possible machine learning techniques 175). As noted, one or more detection parameters 620 (e.g., type of alert, number of detections, time of detection, and the like) can also be fine-tuned or updated by a security analyst to generate model output 615, as shown in FIG. 6. The process ends at 725 by deploying the trained alert triage classification model to process new detection messages. For example, as shown in FIG. 5, ATC model 185 is deployed to process unclassified new detection message 540 as a threat or not a threat.

Therefore, it will be appreciated that the systems, methods, and processes disclosed herein for a machine learned alert triaging classification system that uses machine learning techniques to generate an alert triage classification model that can be trained and deployed in modern SOCs, optimize alert triaging and cyber threat classification.

Example Computing and Networking Environment

Figure 8:
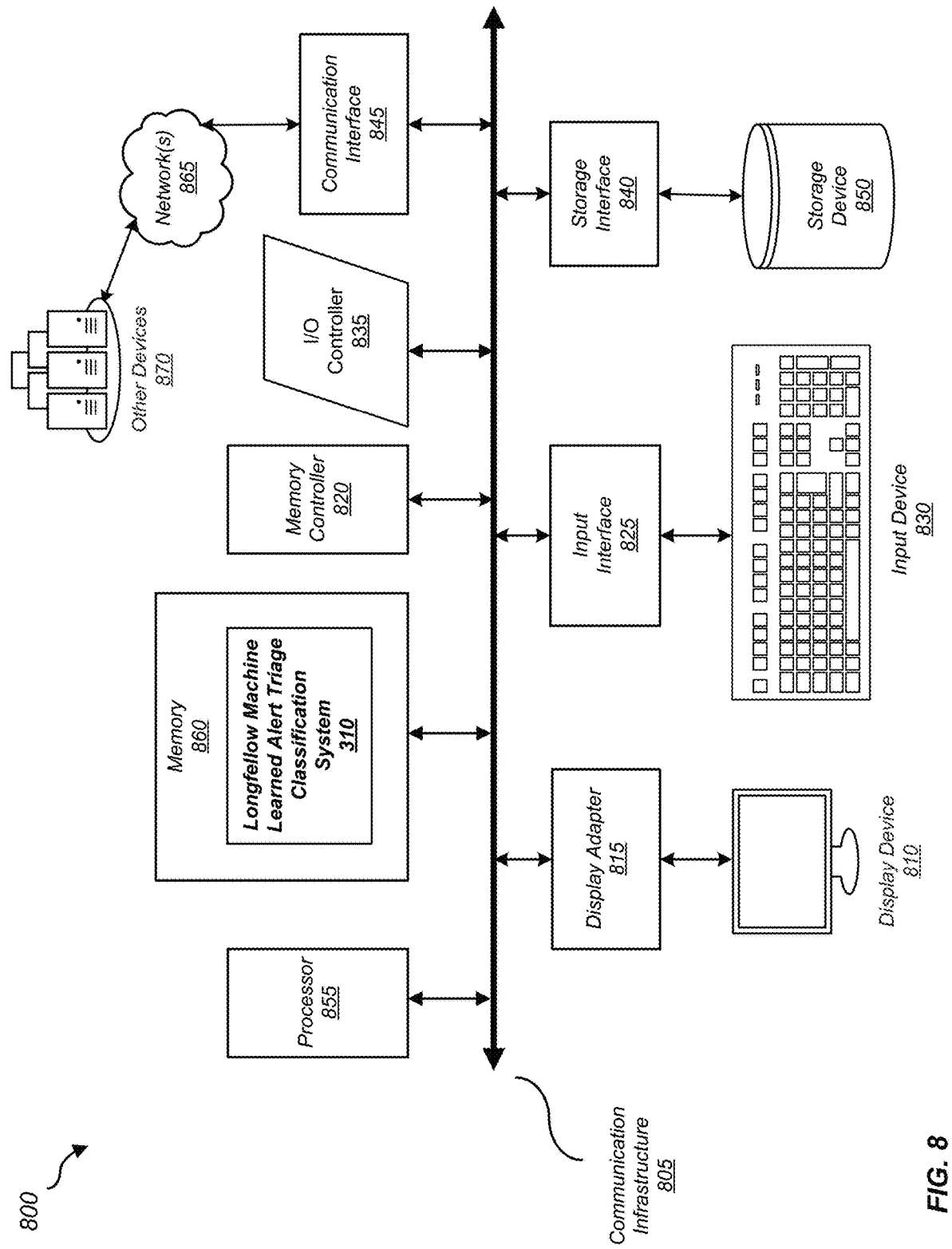
FIG. 8 is a block diagram 800 of a computing system, illustrating how a Longfellow machine learned alert triage classification system can be implemented in software, according to certain embodiments.

FIG. 8 is a block diagram 800 of a computing system, illustrating how a Longfellow machine learned ATC system 310 can be implemented in software, according to one embodiment. Computing system 800 can include ATC server 225 or the computing systems illustrated in FIG. 1 or 5, and broadly represents any single or multi-processor computing device or system capable of executing computer-readable instructions (e.g., a server, a laptop, a desktop, a virtual machine, a mobile phone, and the like). In its most basic configuration, computing system 800 may include at least one processor 855 and a memory 860. By executing the software that executes Longfellow machine learned ATC system 310, computing system 800 becomes a special purpose computing device that is configured to perform machined learned alert triage classification in modern SOCs by implementing one more ATC models such as ATC model 170 and ATC model 180 for automated cyber threat classification.

Processor 855 generally represents any type or form of processing unit capable of processing data or interpreting and executing instructions. In certain embodiments, processor 855 may receive instructions from a software application or module. These instructions may cause processor 855 to perform the functions of one or more of the embodiments described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 800 may include both a volatile memory unit and a non-volatile storage device. In one example, program instructions implementing Longfellow machine learned ATC system 310 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805. In certain embodiments, memory controller 820 may perform and/or be a means for performing, either alone or in combination with other elements, one or more of the operations or features described and/or illustrated herein. I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type/form of communication device/adapter capable of facilitating communication between computing system 800 and other devices and may facilitate communication between computing system 800 and a private or public network. Examples of communication interface 845 include, a wired network interface (e.g., network interface card), a wireless network interface (e.g., a wireless network interface card), a modem, and any other suitable interface.

Computing system 800 may also include at least one display device 810 coupled to communication infrastructure 805 via a display adapter 815 that generally represents any type or form of device capable of visually displaying information forwarded by display adapter 815. Computing system 800 may also include at least one input device 830 coupled to communication infrastructure 805 via an input interface 825. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive, a flash drive, or the like. Storage interface 840 generally represents any type or form of interface or device for transmitting data between storage device 850, and other components of computing system 800. Storage device 850 may be configured to read from and/or write to a removable storage unit configured to store computer software, data, or other computer-readable information.

Many other devices or subsystems may be connected to computing system 800. Conversely, all of the components and devices illustrated in FIG. 8 need not be present to practice the embodiments described and/or illustrated herein and may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850. When executed by processor 855, a computer program loaded into computing system 800 may cause processor 855 to perform and/or be a means for performing the functions of one or more of the embodiments described/illustrated herein. Alternatively, one or more of the embodiments described and/or illustrated herein may be implemented in firmware and/or hardware.

Networks 865 generally represents any type or form of computer networks or architectures capable of facilitating communication between Longfellow machine learned ATC system 310, detection source systems 112(1)-(N), machines 110(a)-(d), detection data collection system 115, model training system 150, machine ATC system 180, clients 205, ATC server 225, and/or any combination of the foregoing. For example, network 265 of FIG. 2, which can be part of networks 865, can be a Wide Area Network (WAN) (e.g., the Internet) or a Local Area Network (LAN). However, the embodiments described and/or illustrated herein are not limited to the Internet or any particular network-based environment.

In some examples, all or a portion of Longfellow machine learned ATC system 310 or any of the computing systems described and/or disclosed herein may represent portions of a cloud-computing or network-based environment. Cloud-computing environments may provide various services and applications via the Internet (e.g., cybersecurity protection services provided by detection source systems 215(1)-(N)). These cloud-based services (e.g., software as a service, platform as a service, infrastructure as a service, etc.) may be accessible through a web browser or other remote interface (e.g., configuration interface 515).

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method, comprising:
    performing, by one or more hardware processors with associated memory that implement an alert triage classification system:
        monitoring a detection message queue associated with one or more detection source systems that protect a set of machines, wherein:
            the detection message queue stores a plurality of detection messages associated with alerts generated for the set of machines received over a network,
            the plurality of detection messages are received from the one or more detection source systems operating on each of the set of machines, and
            each detection message comprises detection data associated with a machine protected by at least one detection source system and detection metadata associated with the at least one detection source system;
        for each detection message in the detection message queue:
            accessing a merging key that is part of a detection message, wherein information in the merging key indicates whether the detection message is associated with an existing alert; and
            based on the information in the merging key accessed, appending the detection message to the existing alert or generating another alert for the detection message;
        using the detection messages in the detection message queue to build a training dataset of a plurality of classified records, wherein each classified record in the training dataset comprises:
            detection characteristics data associated with an alert, including (a) a hostname or internet protocol (IP) address of a machine identified by the alert, (b) a detection type of the alert, and (c) a severity level of the alert, and
            a truth label indicating a threat classification result produced by performing an alert triage classification of the alert based on the detection characteristics data of the alert; and
        training an alert triage classification model using the training dataset and according to a supervised machine learning technique, wherein the training tunes the alert triage classification model to classify, based on the detection characteristics data, a new detection message associated with a new alert generated for the set of machines as a threat or as not a threat.

2. The computer-implemented method of claim 1, further comprising:
    performing, by a network-accessible service that implements the alert triage classification system:
        collecting the detection characteristics data for the training dataset from the one or more detection source systems;
        performing the alert triage classification on each detection message in the detection message queue to generate threat classification results for the training dataset; and
        subsequent to the training, using the alert triage classification model to classify the new detection message as the threat or as not the threat.

3. The computer-implemented method of claim 1, wherein
    the one or more detection source systems comprise at least an agent, a scan engine, a vulnerability management (VM) system, a security information and event management (SIEM) system, a penetration testing system, an application security testing system, and/or a cloud security posture management (CSPM) system.

4. The computer-implemented method of claim 1, wherein
    the alert triage classification is performed based on whether detection data and/or detection metadata in the detection message indicates that a corresponding machine is subject to and/or potentially subject to one or more types of malicious attacks.

5. The computer-implemented method of claim 1, wherein
the detection message comprises a list of key-value pairs (KVPs).

6. The computer-implemented method of claim 1, wherein
the detection data comprises Secure Shell (SSH) information, a geo-location, process information, user information, and/or PowerShell information associated with the machine, and
the detection metadata comprises at least an organization identifier and a version identifier associated with a detection source system.

7. A non-transitory computer readable storage medium comprising program instructions executable to implement an alert triage classification system configured to:
monitor a detection message queue associated with one or more detection source systems that protect a set of machines, wherein:
the detection message queue stores a plurality of detection messages associated with alerts generated for the set of machines received over a network,
the plurality of detection messages are received from the one or more detection source systems operating on each of the set of machines, and
each detection message comprises detection data associated with a machine protected by at least one detection source system and detection metadata associated with the at least one detection source system;
for each detection message in the detection message queue:
access a merging key that is part of a detection message, wherein information in the merging key indicates whether the detection message is associated with an existing alert; and
based on the information in the merging key accessed, append the detection message to the existing alert or generate another alert for the detection message;
use the detection messages in the detection message queue to build a training dataset of a plurality of classified records, wherein each classified record in the training dataset comprises:
detection characteristics data associated with an alert, including (a) a hostname or internet protocol (IP) address of a machine identified by the alert, (b) a detection type of the alert, and (c) a severity level of the alert, and
a truth label indicating a threat classification result produced by performing an alert triage classification of the alert based on the detection characteristics data of the alert; and
train an alert triage classification model using the training dataset and according to a supervised machine learning technique, wherein the training tunes the alert triage classification model to classify, based on the detection characteristics data, a new detection message associated with a new alert generated for the set of machines as a threat or as not a threat.

8. The non-transitory computer readable storage medium of claim 7, wherein
the alert triage classification system is implemented as part of a network-accessible service configured to:
collect the detection characteristics data for the training dataset from the one or more detection source systems;
perform the alert triage classification on each detection message in the detection message queue to generate threat classification results for the training dataset; and
subsequent to the training, use the alert triage classification model to classify the new detection message as the threat or as not the threat.

9. The non-transitory computer readable storage medium of claim 7, wherein
the one or more detection source systems comprise at least an agent, a scan engine, a vulnerability management (VM) system, a security information and event management (SIEM) system, a penetration testing system, an application security testing system, and/or a cloud security posture management (CSPM) system.

10. The non-transitory computer readable storage medium of claim 7, wherein
the alert triage classification is performed based on whether detection data and/or detection metadata in the detection message indicates that a corresponding machine is subject to and/or potentially subject to one or more types of malicious attacks.

11. The non-transitory computer readable storage medium of claim 7, wherein
the detection message comprises a list of key-value pairs (KVPs).

12. The non-transitory computer readable storage medium of claim 7, wherein
the detection data comprises Secure Shell (SSH) information, a geo-location, process information, user information, and/or PowerShell information associated with the machine, and
the detection metadata comprises at least an organization identifier and a version identifier associated with a detection source system.

13. A system comprising:
one or more processors and a memory coupled to the one or more processors-storing program instructions executable by the one or more processors to implement an alert triage classification system, configured to:
monitor a detection message queue associated with one or more detection source systems that protect a set of machines, wherein:
the detection message queue stores a plurality of detection messages associated with alerts generated for the set of machines received over a network,
the plurality of detection messages are received from the one or more detection source systems operating on each of the set of machines, and
each detection message comprises detection data associated with a machine protected by at least one detection source system and detection metadata associated with the at least one detection source system;
for each detection message in the detection message queue:
access a merging key that is part of a detection message, wherein information in the merging key indicates whether the detection message is associated with an existing alert; and based on the information in the merging key accessed, append the detection message to the existing alert or generate another alert for the detection message;
use the detection messages in the detection message queue to build a training dataset of a plurality of classified records, wherein each classified record in the training dataset comprises:
 detection characteristics data associated with an alert, including (a) a hostname or internet protocol (IP) address of a machine identified by the alert, (b) a detection type of the alert, and (c) a severity level of the alert, and
 a truth label indicating a threat classification result produced by performing an alert triage classification of the alert based on the detection characteristics data of the alert; and
train an alert triage classification model using the training dataset and according to a supervised machine learning technique, wherein the training tunes the alert triage classification model to classify, based on the detection characteristics data, a new detection message associated with a new alert generated for the set of machines as a threat or as not a threat.

14. The system of claim 13, wherein
the alert triage classification system is implemented as part of a network-accessible service configured to:
 collect the detection characteristics data for the training dataset from the one or more detection source systems;
 perform the alert triage classification on each detection message in the detection message queue to generate threat classification results for the training dataset; and
 subsequent to the training, use the alert triage classification model to classify the new detection message as the threat or as not the threat.

15. The system of claim 13, wherein
the one or more detection source systems comprise at least an agent, a scan engine, a vulnerability management (VM) system, a security information and event management (SIEM) system, a penetration testing system, an application security testing system, and/or a cloud security posture management (CSPM) system.

16. The system of claim 13, wherein
the alert triage classification is performed based on whether detection data and/or detection metadata in the detection message indicates that a corresponding machine is subject to and/or potentially subject to one or more types of malicious attacks.

17. The system of claim 13, wherein
the detection data comprises Secure Shell (SSH) information, a geo-location, process information, user information, and/or PowerShell information associated with the machine, and
the detection metadata comprises at least an organization identifier and a version identifier associated with a detection source system.

* * * * *